United States Patent [19]

Ibata et al.

[11] 3,925,272
[45] Dec. 9, 1975

[54] COMPOSITE ELASTOMER COMPOSITIONS

[75] Inventors: Jyoji Ibata, Saitama; Hidehiko Kobayashi; Kazuo Toyomoto, both of Tokyo; Kazuhiro Suzuoki; Sumitaka Nogami, both of Saitama, all of Japan

[73] Assignee: Asahi Kasei Kogyo Kabushiki Kaisha, Osaka, Japan

[22] Filed: Mar. 19, 1973

[21] Appl. No.: 342,904

[30] Foreign Application Priority Data
Mar. 18, 1972  Japan............................ 47-027938

[52] U.S. Cl.................... 260/4; 260/5; 260/23 AR; 260/23 S; 260/23 H; 260/23.7 H; 260/23.7 B; 260/31.8 DR; 260/31.8 PQ; 260/33.6 AQ; 260/752; 260/759; 260/761

[51] Int. Cl.² ... C08L 7/00; C08L 9/06; C08K 5/01; C08K 5/12

[58] Field of Search ....... 260/862, 33.6 AQ, 23 AR, 260/23 S, 23 H, 23.7 H, 23.7 B, 31.8 DR, 31.8 PQ, 752, 759, 761, 5, 4

[56] References Cited
UNITED STATES PATENTS

| | | |
|---|---|---|
| 2,609,353 | 9/1952 | Rubens et al...................... 260/862 |
| 3,526,606 | 9/1970 | Minekawa et al........... 260/33.6 AQ |
| 3,674,893 | 7/1972 | Nowak et al......................... 260/862 |
| 3,676,387 | 7/1972 | Lindlof....................... 260/33.6 AQ |
| 3,692,711 | 9/1972 | Eaton et al................. 260/33.6 AQ |

OTHER PUBLICATIONS

Monsanto – Technical Bulletin O/PL–306, "Aroclor Plasticizers," pp. 18–19, Jan. 1968.

*Primary Examiner*—Donald E. Czaja
*Assistant Examiner*—H. H. Fletcher
*Attorney, Agent, or Firm*—Sughrue, Rothwell, Mion, Zinn & Macpeak

[57] ABSTRACT

A composite elastomer comprising at least four components: (a) a rubber elastomer of a conjugated diolefin polymer and/or a copolymer of a conjugated diolefin and a vinyl compound, etc.; (b) an unsaturated polyester; (c) a copolymerizable and crosslinkable monomer; and (d) a plasticizer. The components are admixed in an appropriate amount to prepare a liquid composition, and the resulting composition is heated and crosslinked to solidify the same, whereby the composite elastomer is manufactured.

28 Claims, 4 Drawing Figures

COMPOSITE ELASTOMER COMPOSITIONS

BACKGROUND OF THE INVENTION

1. Field of the Invention

The present invention relates to liquid rubber compositions, more precisely, to those having excellent processing ability for molding processes such as injection molding, casting, etc., as well as to liquid rubber elastomer compositions from which industrially useful products having excellent elasticity, heat stability and resistance to oil are produced.

2. Description of the Prior Art

In the rubber processing industries, heretofore very complicated steps have been required for the molding and processing of rubber materials. For example, in the case that a natural rubber is used as a raw material to manufacture a product, various steps such as mastication, blending, mixing, molding, shaping, vulcanization, etc. are required, as is a great amount of labor.

In order to simplify these steps, liquid rubber was developed. However, conventional liquid rubbers have various defects in that not only is the manufacturing cost therefor high, but also the strength of a rubber elastomer obtained from the liquid rubber is low. That is, for the manufacture of butadiene polymers having low molecular weights or of polymers containing active terminal groups by the living polymerization of butadiene using a lithium catalyst, in general, a large amount of polymerization catalyst and a large amount of polymerization controlling agent are required and, further, the amount of vulcanization agent needed is expensive and a large amount of such an expensive agent is required. The manufacturing cost is very high due to these reasons. In addition, rubber products which have been manufactured by the above menthods are, in general, poor in tensile strength. Under such circumstances, these rubber products have not yet been put to sufficient practical use except in specialized applications.

Various methods have hitherto been suggested and practised for the purpose of improving the mechanical properties of molded rubber products, e.g., grafted rubbers with various kinds of vinyl compounds have been used, or blended rubbers with unsaturated polyesters have been used. In each of these methods however, the main ingredient constituting the compositions to be used is rubber, and these compositions are not liquid at normal temperature, and thus the molding and processing steps for such compositions are troublesome and complicated.

SUMMARY OF THE INVENTION

After extensive efforts to essentially eliminate the above mentioned defects of the prior art, the inventors have unexpectedly found that these defects may efficiently be overcome as follows. That is, the components comprising: (a) a rubber elastomer of a conjugated diolefin polymer and/or a copolymer of a conjugated diolefin and a vinyl compound, etc., commercially available of a relatively high molecular weight; (b) an unsaturated polyester having polymerizable $\alpha,\beta$-substituted and unsaturated group(s); (c) a copolymerizable and crosslinkable monomer; and (d) a plasticizer, upon being admixed in an appropriate amount, provide a liquid composition which can be heated and crosslinked, e.g., by using a radical catalyst or the like, to solidify the same, whereby a rubber elastomer is manufactured.

DETAILED DESCRIPTION OF THE INVENTIOn

Figure 2:
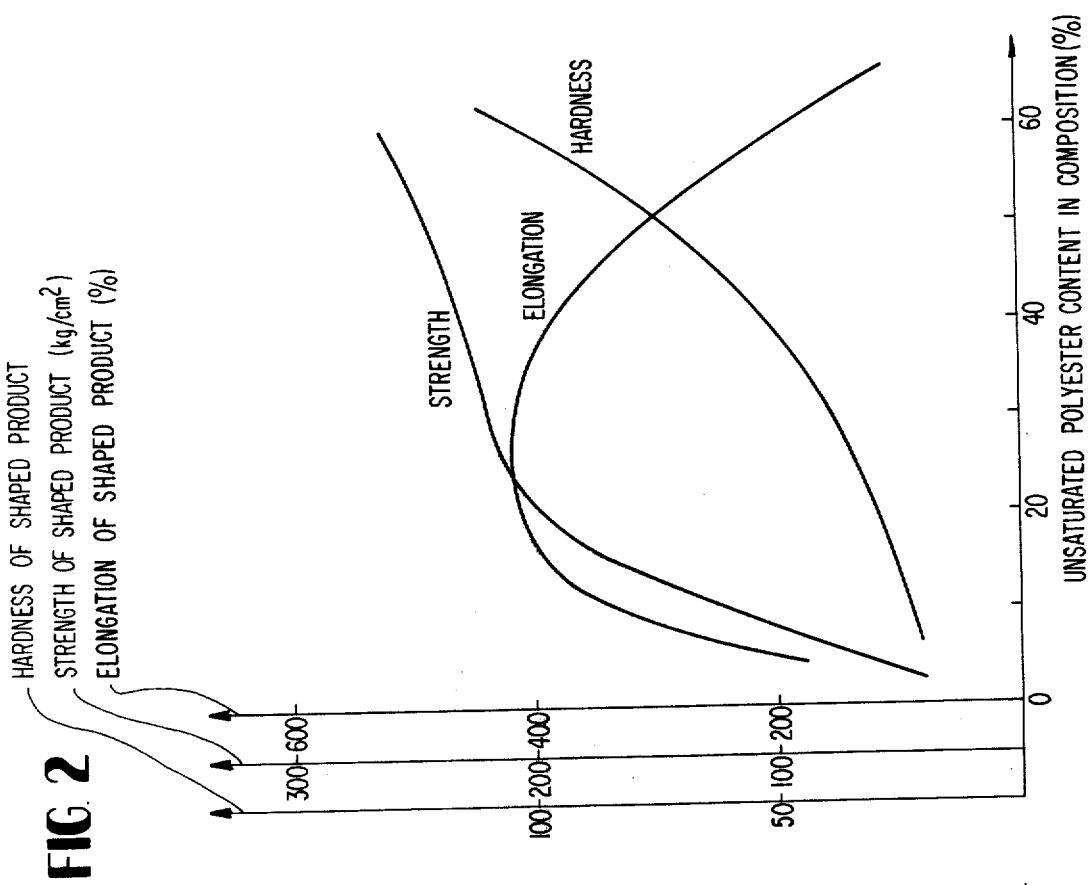
FIG. 2 shows the relationship between the content of the unsaturated polyester component and the hardness, tensile strength and elongation of a mold cured product, with variation in the unsaturated polyester content.

The characteristic feature of the present invention is to mold and solidify liquid rubber compositions having viscosities (at normal room temperature) of $10 - 10^5$ poises, preferably $10^2 - 10^4$ poises, under heat or at room temperature and in the presence of catalyst, etc. by means of various methods which are industrially advantageous, such as casting, low pressure injection molding, etc.

Further, in the molding of the liquid rubber compositions of the present invention, only a short period of time is required for molding and, in addition, the temperature of the molding can widely vary, as compared with the case of a so-called vulcanization step for conventional rubber compositions.

The compositions of the present invention have various merits in practical use in that the products obtained from the compositions have excellent rubber elasticity and keep their excellent properties at high temperature, and further have excellent oil-resistance and so on, as compared with conventional products obtained from various kinds of synthetic rubbers such as polybutadiene rubbers, polybutadiene-styrene copolymer rubbers, etc.

The compositions of the present invention contain at least the following four components: (a) 10 – 50 parts, preferably 15 – 45 parts, of a rubber component such as a rubber elastomer, e.g., a conjugated diolefin polymer and/or a copolymer of a conjugated diolefin and vinyl compound, or a non-vulcanized natural rubber, etc.; (b) 5 – 60 parts of a polymerizable $\alpha,\beta$-substituted and ethylenically unsaturated polyester; (c) 5 – 50 parts of a crosslinkable monomer which can be copolymerized with the above mentioned rubber component and/or the unsaturated polyester; and (d) 5 – 70 parts, preferably 15 – 60 parts, of a plasticizer such as liquid paraffin, process oil, etc., each proportion being based upon 100 parts by weight of total composition.

The compositions are liquid rubber compositions having viscosities of $10 - 10^5$ poises, preferably $10^2 - 10^4$ poises, at normal room temperature.

The proportion of the above mentioned components constituting the rubber compositions of the present invention may freely and optionally be changed within the scope as defined above, depending upon the necessary characteristics of the molded products, the processing ability thereof, etc.

As the rubber component(s) used in the present invention, there are mentioned, for example, polybutadiene, polychlorobutadiene, polyisobutylene (including copolymers thereof with isoprene, most preferably 10 – 40 mol% isobutylene, 60 – 90 mol% isoprene), polyisoprene, copolymers of ethylene and propylene, most preferably of 10 – 40 mol% ethylene, balance propylene, acrylic rubber, copolymers of various diolefins and acrylonitrile, for example copolymers of butadiene or isoprene with acrylonitrile, most preferably 10 – 40 mol% diolefin and 60 – 90 mol% acrylonitrile, random or block copolymers (the block copolymers are described in greater detail below) of styrene-butadiene, nonvulcanized natural rubbers, for example, grades such as ribbed smoked sheet No. 1 to No. 6, or brown crepe (estate brown crepe, thick blanket crepe, flat barke crepe and pure smoked blanket crepe) and the like, polybutadiene terminated with hydroxy or carboxy terminal groups, etc. These are used singly or in the form of a mixed combination of two or more.

While the elastomers used are not limited to the above materials, preferred elastomers are those (including, of course, the materials recited above) of a Mooney viscosity ($ML_{1+4}$ (100°C)) of from about 20 to about 70, most preferably 40 to 50 (See, however, the discussion regarding the block elastomers which follows).

In particular, preferred rubber components are thermoplastic block elastomers of the following formulae:

$(A-B)_{n+1}$ and/or
$B—(A—B)_{n+1}$ and/or
$A—(B-A)_n$ wherein A represents a copolymer block of a vinyl aromatic compound, preferably, vinyl compounds of the formula

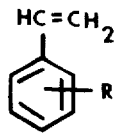

wherein R is hydrogen, halogen, preferably chlorine, alkyl, preferably $C_1$ to $C_5$ alkyl, and the like, B represents a conjugated diolefin polymer block such as butadiene or isoprene, and n represents an integer of 1 – 20, the proportion of A blocks in the molecule being 5 – 60% by weight. Block elastomers of the above formula are not appropriately described with a Mooney viscosity value, and for these materials most preferred are those of a melt index of from about 0.5 to about 15 g/10 min., most preferably 1 to 10 g/10 min. [2.16 kg at 190°C]. Most preferred among this class of block elastomers are those containing 10 – 40 mol% vinyl compound, e.g, styrene, and 90 – 60 mol% conjugated diolefin, e.g., butadiene, better yet 15 – 30 and 85 – 70 mol% vinyl compound and conjugated diolefin, respectively.

Such block elastomers may be formed, for example, in accordance with the processes described in British Pat. Nos. 888,624 or 1,130,770.

The compositions containing the thermoplastic block elastomers are excellent in molding and processing ability, and, in addition, the mold cured products of the compositions have excellent elasticity, excellent properties at normal room temperature, excellent oil-resistance, excellent permanent set characteristics and other excellent properties. Thus, the mold cured products obtained from the compositions of the present invention have various excellent characteristics which cannot be anticipated from the properties of the polymers as raw materials. These merits can be attained due to the synergistic effects of the respective components constituting the rubber compositions of the present invention, and the synergistic effects are extremely apparent.

The average molecular weight of the polymer used as the rubber component in the present invention is 10,000 – 2,000,000, preferably 50,000 – 500,000, and in particular, in the case of the above mentioned thermoplastic block elastomers of the recited formula as the rubber component, the average molecular weight thereof is 10,000 – 1,000,000, preferably, 50,000 – 750,000.

The most significant characteristic features of the present invention are as follows: Even when a commercially available polymer having a relatively high molecular weight is used, a composite composition which is liquid at normal temperature can be obtained and, in addition, due to the use of such commercially available polymers of high molecular weight, molded rubber products having excellent tensile strength and elongation characteristics can be manufactured and, further, the manufacturing cost for such compositions can be reduced.

Explanation will be given hereunder or the proportions of the respective components constituting the rubber composition, which is also one of the characteristic features of the present invention.

Figure 1:
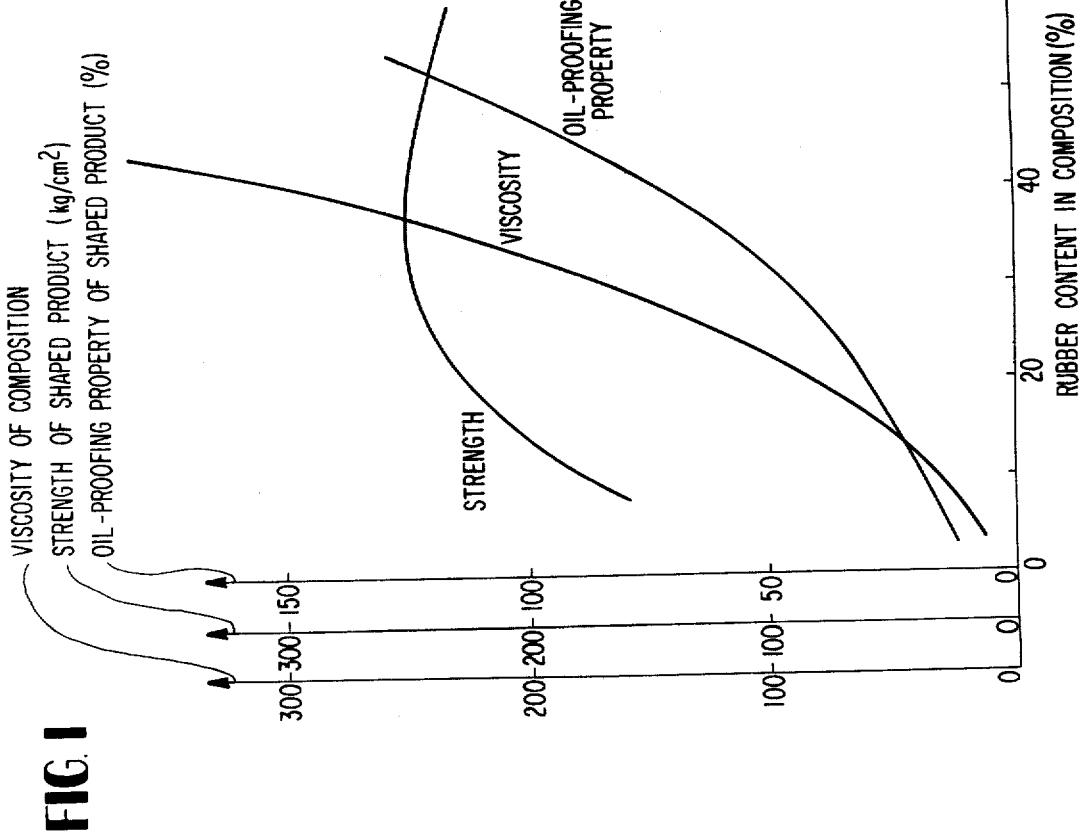
FIG. 1 shows the relationship between the content of the rubber component and the viscosity of the composition, the tensile strength of a mold cured product and the oil-resistance of a mold cured product, with variation in the rubber content.

In the present invention, when the content of the rubber component is less than 10 parts by weight per 100 parts by weight of the composition, the plasticizer will separate out during the molding of the composition, and thus sufficient molding cannot be completed. The viscosity of the composition rapidly increases with an increase of the content of the rubber component, as shown in FIG. 1, and as the result thereof, the molding and processing ability of the composition is extremely lowered. In addition, when the content of the rubber component is more than 50 parts by weight per 100 parts by weight of the composition, it is confirmed by an oil-resistance test that the swelling by the experimental oil is high, and in some cases a part of the composition became soluble. Accordingly, a larger proportion is unsuitable for attaining all objects of the present invention.

Representatives of the unsaturated polyester(s) used in the present invention are, for example, unsaturated polyesters obtained from a polyhydric alcohol such as a saturated or unsaturated difunctional polyhydric alcohol, e.g., ethylene glycol, diethylene glycol, triethylene glycol, propylene glycol, dipropylene glycol, 1,3-butane-diol, etc., or a mixture of two or more of such alcohols, a saturated dicarboxylic acid such as adipic acid, sebacic acid, pimelic acid, succinic acid, terephthalic acid, isophthalic acid, phthalic acid, etc., or a mixture of two or more of such saturated acids, and an unsaturated dicarboxylic acid such as maleic acid (maleic anhydride), fumaric acid, itaconic acid, etc., or a mixture of two or more of such unsaturated acids.

These unsaturated polyesters can be prepared, for example, as follows:

1.0 – 1.5 mols of difunctional alcohol, 0.8 0.2 mol (preferably, 0.6 – 0.4 mol) of unsaturated dicarboxylic acid and 0.2 – 0.8 mol (preferably, 0.4 – 0.6 mol) of saturated dicarboxylic acid are charged in the reactor and reacted in an inert gas ($O_2$ free) atmosphere for about 10 hours at 160° – 210°C.

The reaction is then further conducted for 3 – 5 hours at normal pressure, and then further for 7 – 5 hours at less than 50 mmHg to obtain the unsaturated polyester.

This reaction can usually be conducted without a catalyst, but 0.01 – 0.05 parts by weight based on all reactants of a catalyst, e.g., p-toluene sulfonic acid or manganese acetate, can be added as a catalyst.

The average molecular weight of the unsaturated polyester is 500 – 10,000, preferably 700 – 2,000.

As is known to the art, one mol of —OH groups in the above alcohols reacts with one mole of —COOH groups. Most preferred are those unsaturated polyesters where the molar ratio of unsaturated carboxylic acid : saturated carboxylic acid is 2–8 : 8–2, most preferably 4–6 : 6–4.

With respect to the content of the unsaturated polyester, when the content is particularly small, the tensile strength of the resulting product becomes smaller than 100 kg/cm$^2$, and this is unfavorable for the practical use of the products. The hardness of the molded product rapidly increases with an increase of the content of the unsaturated polyester, as shown in FIG. 2. In addition, the elongation of the product is extremely lowered with the increase. Finally, when more than 60 parts by weight of the polyester per 100 parts by weight of the composition is used, the elongation of the molded product is less than 100%. In such a condition, the molded product obtained from the composition no longer has any rubber elasticity, and so the object of the present invention cannot be attained.

The crosslinkable monomer(s) used in the present invention are monomers containing ethylenically unsaturated bonds, for example, a mono-functional type crosslinkable monomer such as acrylic acid, methacrylic acid or an alkyl ester thereof, preferably with a saturated hydrocarbon group of 1 – 10 carbon atoms, styrene, chloro-styrene, vinyl-toluene, etc., or a polyfunctional type crosslinkable monomer such as diethylene-glycol diacrylate, divinyl-benzene, etc., or a mixture of two or more of such monomers.

Figure 3:
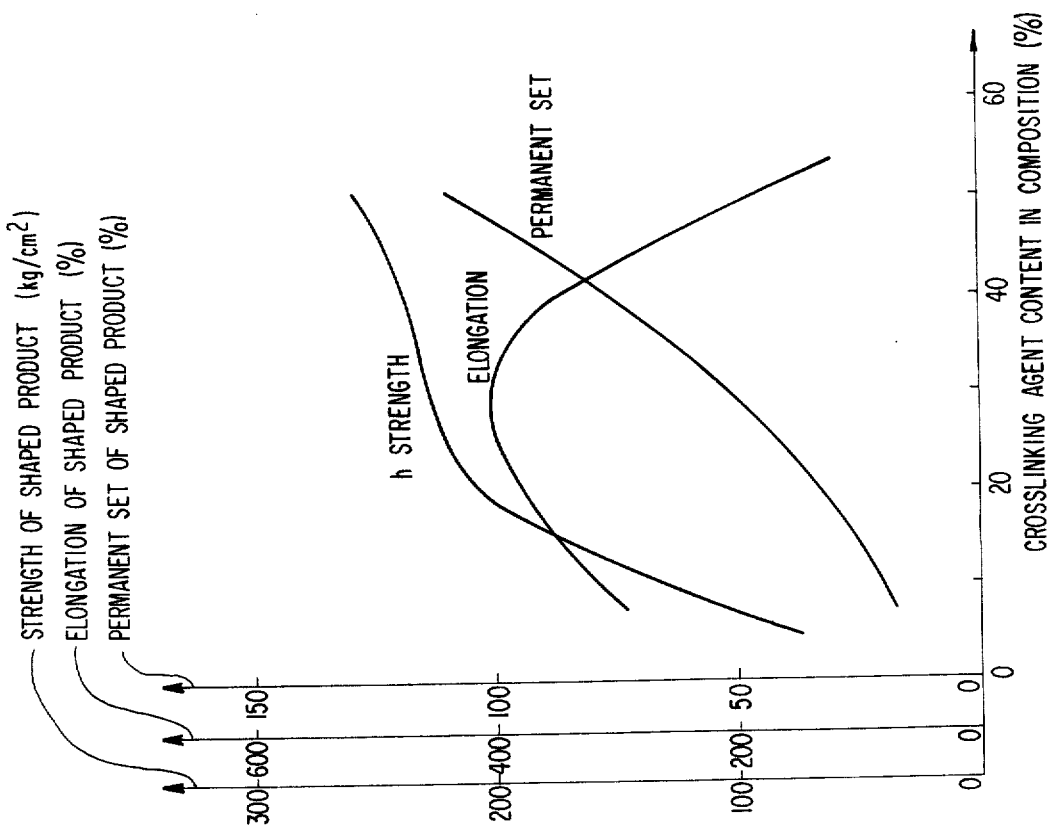
FIG. 3 shows the relationship between the content of the crosslinking agent component and the tensile strength, elongation and permanent set of a mold cured product, with variation in the crosslinking agent content.

The relationship between the content of the crosslinkable monomer and the various properties of the molded product is shown in FIG. 3. As will be understood from the FIG. 3, when the content of the crosslinkable monomer is particularly small, the tensile strength of the molded product becomes less than 100 kg/cm$^2$, and such a product is unsuitable for practical use. On the contrary, when the content of the crosslinkable monomer is more than 50 parts by weight per 100 parts by weight of the composition, the permanent set of the molded product is more than 100% and the elongation thereof is less than 100%. In such a condition, the molded product no longer has any rubber elasticity, and thus the object of the present invention cannot be attained.

The plasticizer(s) used in the present invention are ones which have the capability to at least dissolve the rubber component or to swell the same, for example, petroleum series process oil such as paraffin series process oil, naphthene series process oil, aromatic series process oil, etc., liquid paraffins, n-butene polymers, isobutene polymers, copolymers of n-butene and isobutene, polybutadiene polymers having low molecular weight, phthalic acid esters, preferably with a $C_5 - C_{15}$ saturated hydrocarbon, such as dioctyl phthalate, fatty acid esters, preferably with a $C_4 - C_{10}$ saturated hydrocarbon, such as dioctyl adipate, etc, or a mixture of two or more of such substances.

Liquid paraffins can be described as hydrocarbon oils produced by highly refining a spindle oil with sulfuric acid and washing, and they consist mainly of alkylnaphthenes. Their specific gravity is usually in the range of 0.840 to 0.905. Process oils must appropriately used in the present invention are defined in British Pat. No. 1,293,589 at page 4.

Process oils are composed of high boiling fractions of petroleum. Based upon the chemical structure of the hydrocarbon molecules in the oil they are classified into the paraffin series composed of saturated chain hydrocarbons, the naphthene series composed of saturated cyclic hydrocarbons and the aromatic series composed of unsaturated cyclic hydrocarbons. They are usually classified depending upon the viscosity-specific gravity constant (abbreviated as a V.G.C.), generally one with V.G.C. from 0.790 to 0.849 being classified into the parrafin series, one with a V.G.C. from 0.850 to 0.899 into the naphthene series and one with a V.G.C. of 0.900 or higher into the aromatic series.

Reference can also be made to the Encyclopedia of Chemical Technology, Vol. 10, pages 161 – 227, Table III, disclosing additional plasticizers useful in the present invention, e.g., petroleum spirits, rubber solvent and aromatic solvents as described therein.

Preferred plasticizers among the above mentioned substances are ones which have viscosities of 10 centipoises or more to 10$^4$ poises or less.

Figure 4:
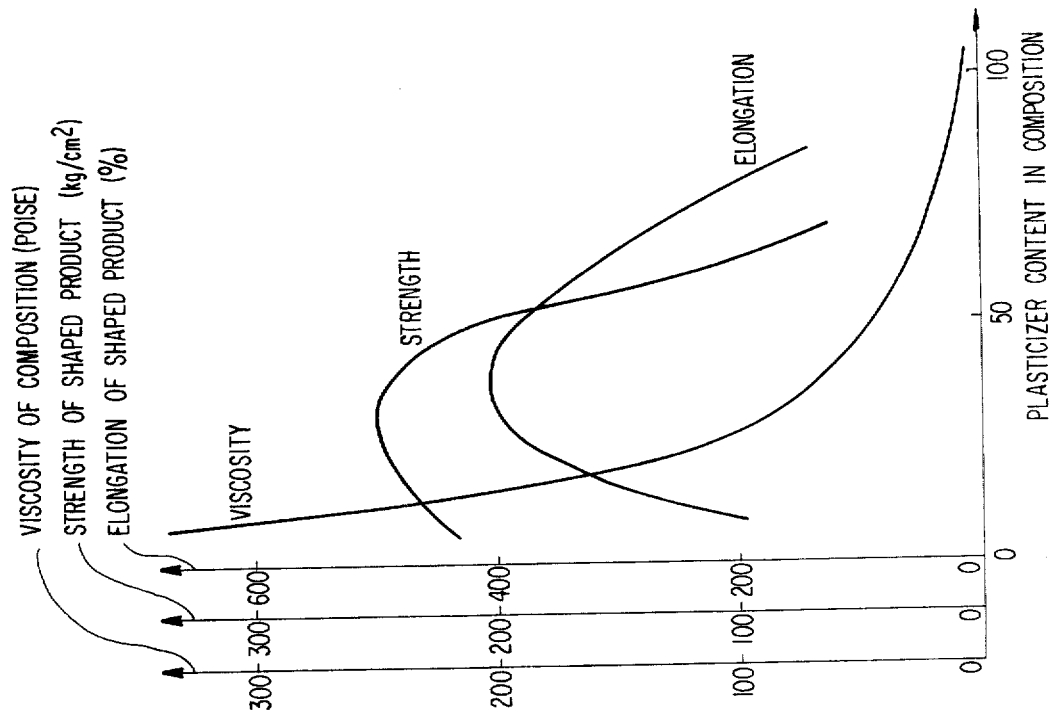
FIG. 4 shows the relationship between the content of the plasticizer component and the viscosity of the composition and the tensile strength and elongation of a mold cured product, with variation in the plasticizer content.

In the present invention, the effect of the plasticizer is remarkable, and the proportion thereof in the composition is significantly important in the relationship to the various characteristics of the composition and the molded product. That is, as shown in FIG. 4, when the content of the plasticizer is particularly small, the viscosity of the composition is high and as the result the processing ability thereof becomes extremely poor. In such a condition, the improvement of the processing ability which is one of the most important objects of the present invention cannot be attained. In addition, in the case that the content of the plasticizer is particularly small, the elongation of the molded product is small and this product is unsuitable as a rubber elastomer for practical use. The tensile strength and the elongation of the molded product rapidly lower with an increase in the content of the plasticizer to more than a determined amount. In the case that the content of the plasticizer is more than 75 parts by weight per 100 parts by weight of the composition, the tensile strength of the molded product is less than 100 kg/cm$^2$ and the elongation thereof is less than 100%. Thus, the mechanical properties of the molded product are extremely lowered and, in addition, the plasticizer bleeds out from the molded product. These phenomena are unfavorable in the practical use of the product.

In the present invention, all four components (a), (b), (c) and (d) are indispensible elements. If even one component is omitted, the processing ability of the composition and the rubber elasticity of the molded products are extremely damaged. For example, although it is possible to manufacture a rubber product having good heat resistance from a composition which does not contain a plasticizer (by shaping and vulcanizing the composition in the presence of a radical catalyst or by blending a vulcanizing agent or a filler such as carbon black, etc., in the composition), the resulting rubber product obtained is extremely hard and the rubber properties thereof such as elongation, elasticity, etc., are very poor. Moreover, since the composition not containing the plasticizer is not liquid, the molding and processing thereof are very difficult.

The present invention provides liquid rubber compositions which have various advantageous merits by blending the above mentioned four components in the scope of the above mentioned proportions. The merits of the liquid rubber compositions of the present invention are as follows: The compositions are liquid at normal temperature, and so it is possible to mold and process the same in the presence of a radical catalysts, etc., at a far lower temperature than that used with conventional vulcanizations. From the compositions, elastomer products can be manufactured which are excellent in practical use and have various excellent properties, and these properties cannot be anticipated from the additive properties of the respective components. The field of use of the present rubber composition is very wide, not only in the vehicle field (for tires, tubes, etc.), and for use as industrial rubbers, ordinary rubbers (e.g., for footwear) and the like, but also in various other fields such as adhesives, sealing materials, roofing materials, rubberized cloths, etc.

If necessary, other additives may be incorporated in the present compositions in addition to the recited four components, for example, a reinforcing agent such as carbon black, white carbon, etc., a filler such as clay, calcium carbonate, titanium dioxide, a pigment, etc., a vulcanizing agent, a vulcanization accelerating agent, an amine series or phenol series antioxidant, etc. Fillers will usually be used in an amount of 5 phr to 60 phr, and the other additives are used in their art recognized amounts, e.g., 0.1 to 5 phr.

The solidification of the liquid rubber compositions of the present invention can be accomplished by the following method: The composition to be solidified is, in general, heated or permitted to stand at room temperature in the presence of a radical catalyst such as a peroxide, e.g., benzoyl peroxide, di-t-butyl peroxide, cyclohexanone peroxide, etc., or an azo compound, e.g., azobisisobutyronitrile, and additionally, a redox catalyst such as cobalt naphthenate, methylethylketone peroxide, etc., and a benzoin series sensitizer. In addition, it is also possible to vulcanize the composition after a rubber vulcanizing agent and a vulcanization accelerating agent as are generally used have been blended in the composition. Exemplary of such vulcanizers is sulphur, and exemplary of such accelerators are thiazole series accelerators such as 2-mercaptobenzothiazole, dibenzothiazile-dusulphide, sulphenamide series accelerators such as cyclohexyl-benzothiazile-sulphenamide, and the like. The liquid rubber compositions can also be solidified by exposure to ultraviolet radiation.

The conditions of solidification can vary greatly, depending on the exact liquid rubber composition used. While one skilled in the art will appreciate that the solidification conditions can vary, general speaking the following will serve as guidelines to enable one in the art to practice the invention:

molding temperature:room temperature – 180°C
molding pressure: 0 – 500 kg/cm² G
curing time:2 minutes – 30 minutes
free radical catalyst: 0.01 phr – 5 phr The compositions of the present invention can be prepared by any mechanical mixing method or any solution mixing method. In the mixing of the components there is no specific limitation on the order of the addition of the respective components.

The composite compositions of the present invention show a synergistic effect, and have excellent rubber elasticity and characteristics which cannot be anticipated from the respective components. From these composite compositions, various good rubber products can be manufactured at a low cost, and the industrial uses of the resulting products are very wide, e.g., sealant, adhesives, lining materials, paints and varnishes, etc.

The compositions of the present invention are liquid at normal temperature and this has a great significance in the molding and processing of rubber in that the use of a liquid composition results in a progressive simplification of the steps of molding and processing.

The present invention will now be illustrated in more detail by the following examples, which, however, do not limit the scope of the present invention.

All curing pressures are gauge, unless otherwise indicated.

Unless otherwise indicated, V.G.C. is determined in this specification as follows: If $s = sp.gr._{60}{}^{60}$, and $V =$ viscosity at 100°F in S.U.s., then $$\text{viscosity gravity constant} = \frac{10s - 1.0752 \log(V - 38)}{10 - \log(V - 38)}.$$

EXAMPLE 1

Table 1

| Composition | (1) | (2) | (3) | (4) |
|---|---|---|---|---|
| Component | | | | |
| Natural rubber[1] | 25 | | | |
| SBR[2] | | 25 | | |
| SB Block copolymer[3] | | | 25 | |
| Chloroprene rubber[4] | | | | 25 |
| Styrene | 20 | 20 | 20 | 20 |
| Unsaturated polyester[5] | 35 | 35 | 35 | 35 |
| Paraffin oil[6] | 20 | 20 | 20 | 20 |
| Viscosity of composition (poise) | 250 | 125 | 100 | 115 |

(units: parts by weight per 100 parts by weight of composition)

[1] Non-vulcanized natural rubber (ribbed smoked sheet No. 3) was subjected to mastication by means of a mixing roll at 50°C.
[2] Tufdene 2000R by Asahikasei KK (amount of combined styrene: 25%, Mooney viscosity: 45).
[3] Tufprene A by Asahikasei KK (styrene-butadiene block copolymer, specific gravity: 0.95, melt index (ASTM 1238): E 2.6).
[4] By Showa Neoprene KK, type WHV (specific gravity: 1.23 Mooney $ML_{(1+4)}100°C$: 45).
[5] Prepared from 0.4 mol of maleic anhydride, 0.6 mol of phthalic anhydride and 1.1 mols of propylene glycol, molecular weight about 1,000.
[6] Process oil by Kyodo Sekiyu KK (type P-200); V.G.C.: 0.824.

In the respective compositions consisting of the above mentioned components, 1.5% by weight of t-butyl-hydroxy-peroxide was added as a polymerization initiator, and each of the compositions was molded and hardened at 150°C and under a pressure of 35 kg/cm² for 10 minutes.

As a result, rubber elastomers having various excellent properties as mentioned hereunder were obtained.

The properties of the resulting products are shown in the following Table.

In addition, any of this series of materials containing

Table 2

| Characteristic Composition | Tensile strength[1] (kg/cm²) | Elongation[1] (%) | Tear strength[1] (kg/cm) | Hardness[1] (degree) A-type | Elasticity[1] (%) | Permanent set[2] (%) |
|---|---|---|---|---|---|---|
| Composition (1) | 125 | 410 | 85 | 46 | 60 | 35 |
| Composition (2) | 165 | 420 | 80 | 48 | 65 | 30 |
| Composition (3) | 230 | 485 | 105 | 52 | 68 | 30 |
| Composition (4) | 140 | 390 | 85 | 40 | 62 | 32 |

[1]measuring method: JIS K-6301
[2]measuring method: After the sample was elongated 200% at 50°C for 5 hours, the degree of permanent set (%) retained in the elongated sample was measured.

From the above mentioned compositions embodying the present invention, excellent rubber elastomers were obtained even under conditions where a reinforcing agent (such as carbon black), vulcanizing agent, etc. were not added to the compositions. (These additives are, however, important components in conventional rubber compositions). This is one of the preferred characteristic features of the present invention.

The above results show the synergistic effect of the four components of the present invention.

COMPARATIVE EXAMPLE 1

Table 3

| Composition | (5) | (6) | (7) | (8) | (9) | (10) | (11) |
|---|---|---|---|---|---|---|---|
| Component |  |  |  |  |  |  |  |
| SBR* | 50 | 50 | 2 | 55 | 90 | 15 | 10 |
| Styrene | 0 | 30 | 30 | 20 | 3 | 70 | 5 |
| Unsaturated polyester* | 30 | 0 | 30 | 25 | 5 | 8 | 80 |
| Paraffin oil* | 18 | 20 | 38 | 0 | 2 | 7 | 5 |
| Viscosity of composition (poise) | 450 | 300 | 10 | 1200 | — | 10 | 30 |

(units: parts by weight per 100 parts by weight of composition)
*same as in Example 1

The above compositions were molded and hardened under the same conditions as in Example 1.

a large amount of paraffin oil (80 parts or more) would not yield a uniform composition.

Table 4

| Characteristic Composition | Tensile strength (kg/cm²) | Elongation (%) | Tear strength (kg/cm) | Hardness (degree) A-type | Elasticity (%) | Permanent set (%) |
|---|---|---|---|---|---|---|
| Composition (5) | 45 | 120 | 10 | 50 | 32 | — |
| Composition (6) | 40 | 60 | 12 | 90 | 30 | — |
| Composition (7) | 80 | 15 | 40 | >100 | 10 | — |
| Composition (8) | 110 | 165 | 35 | >100 | 35 | — |
| Composition (9) | 12 | 45 | 4 | 35 | 10 | — |
| Composition (10) | 180 | 10 | 55 | >100 | 3 | — |
| Composition (11) | 250 | 5 | 120 | >100 | 5 | — |

Regarding the permanent set, the hardened products obtained from the above compositions had low elongation, and so the samples broke under the measuring conditions. Accordingly, the measurement thereof was impossible.

Comparing these results with the results of Example 1, the synergistic effect of the compositions of the present invention consisting of four components is quite obvious.

EXAMPLE 2

Table 5

| Composition | (12) | (13) | (14) | (15) |
|---|---|---|---|---|
| Component |  |  |  |  |
| SB Block copolymer Tufprene* | 25 | 25 | 25 | 30 |
| Unsaturated polyester* | 30 | 30 | 30 | 40 |
| Styrene | 10 | 10 | 10 | 12 |
| n-Butyl acrylate | 15 | 15 | 15 | 18 |
| Liquid paraffin[1] | 20 | — | 1 | — |
| Process oil[2] | — | 20 | 1 | — |
| Process oil[3] | — | — | 20 | — |

*same material as in Example 1
(units: parts by weight per 100 parts by weight of composition)
[1]liquid paraffin by Kokusan Kagaku KK (first grade agent S.G.: 0.855 or more)
[2]process oil by Kyodo Sekiyu KK (R-50); V.G.C.: 0.873
[3]process oil by Kyodo Sekiyu KK (X-140); V.G.C.: 0.955

For the determination of the effect of plasticizer, 1.5% by weight of benzoyl peroxide was added to the above compositions as a polymerization initiator, and the respective compositions were molded and hardened under the same conditions as in Example 1.

The properties of the molded products are shown in the following Table.

Table 6

| Charac-<br>teristic | Tensile<br>strength<br>(kg/cm²) | Elonga-<br>tion<br>(%) | Tear<br>strength<br>(kg/cm) | Hardness<br>(degree)<br>A-type | Permanent<br>set<br>(%) |
|---|---|---|---|---|---|
| Composition | | | | | |
| Composition (12) | 220 | 450 | 90 | 45 | 28 |
| Composition (13) | 160 | 400 | 80 | 50 | 32 |
| Composition (14) | 185 | 460 | 105 | 52 | 40 |
| Composition (15) | 150 | 150 | 40 | >100 | —¹⁾ |

¹⁾measurement impossible

From the above results, the synergistic effect of the plasticizer and the other three components is obvious, i.e., the plasticizer functions not only to lower the hardness of the product but also to improve, in relation to the other components, the elongation, tear strength, permanent set, etc., of the rubber elastomer.

EXAMPLE 3

The following compositions (16), (17) and (18) were prepared for the purpose of comparing the molding and processing ability and the practical characteristics among them. In this Example, canvas shoes were made from these compositions.

Composition (16): composition (3) of Example 1 plus 10 parts by weight of titanium white per 100 parts by weight of composition (3).

Composition (17): commercial rubber composition containing natural rubber (ribbed smoked sheet No. 3).

Composition (18): To liquid rubber (butadiene-styrene polymer containing two terminal hydroxyl groups; molecular weight: 3,500; butadiene : styrene mol ratio 75 : 25), 20 parts by weight of carbon black, as a filler, and 1.5 parts by weight of 2,4-tolylene diisocyanate were added per 100 parts by weight of rubber.

The molding and processing ability of the obtained canvas shoes and the results of the actual wearing thereof are shown in Table 7 below.

Table 7

| Composition | Relative molding period¹⁾ | Results of actual wearing |
|---|---|---|
| Composition (16) | 1 | abrasion resistance: fairly good |
| Compositon (17) | 10 | abrasion resistance: good |
| Composition (18) | 4.5 | abrasion resistance: poor, seriously worn down |

¹⁾The composition (16) value of 1 is the relative base for comparison (index number).

With respect to the molding ability, it was confirmed that composite composition (16) of the present invention was far superior to compositions (17) and (18).

Regarding practical use as footwear, composition (16) was almost equal to the natural rubber composition (17) and was far superior to the conventional liquid rubber composition (18).

EXAMPLE 4

In order to confirm the relationship between the molecular weight of the rubber component used and the properties of the molded product, the following compositions (19) and (20) were prepared and molded according to the same procedure as in Example 1.

Composition (19): Diene NF 55R¹⁾ by Asahikasei KK was used as the rubber component.

Composition (20): Polyoil 130²⁾ by Hulls A.G. was used as the rubber component.

In these compositions, the components other than the above indicated rubber component were the same as those in Example 1, and the proportion of the four components and the molding conditions were also the same as in Example 1.

1. polybutadiene rubber, 35% cis-1,4-bonds, average molecular weight: 100,000 – 200,000, Mooney viscosity: 55.
2. polybutadiene rubber, 82% cis-1,4-bonds, average molecular weight: 3,200 ± 15%, liquid at normal temperature.

The properties of the molded products formed therefrom are shown in Table 8.

Table 8

| Composition | (19) | (20) |
|---|---|---|
| Characteristic | | |
| Tensile strength (kg/cm²) | 217 | 68 |
| Elongation (%) | 420 | 182 |
| 300% modulus (kg/cm²) | 115 | — |
| Hardness (degree)A-type | 45 | 48 |
| Elasticity (%) | 68 | 69 |
| Permanent set (%) | 30 | 37 |

The measuring methods were same as in Example 1.

As is apparent from the above results, molded rubber products having excellent mechanical characteristics were obtained using high molecular rubber components. In the above cases, the favorable characteristic features of the present compositions were remarkable, and easy processing of the liquid compositions was noted.

EXAMPLE 5

This Example was performed for the purpose of confirming the relationship between the proportion of the four components of the elastic composite composition of the present invention and the properties of the molded product obtained from the composition.

To a liquid composition consisting of four components: (a) Tufprene A¹⁾ as the rubber component; (b) the same unsaturated polyester component as in Example 1; (c) styrene monomer as the crosslinking agent component; and (d) paraffin process oil²⁾ as the plasticizer component 1.5% by weight of t-butyl-hydroxyperoxide was added as a polymerization initiator, and the resulting composition was molded and hardened at 150°C under the pressure of 40 kg/cm² for 10 minutes. The properties of the resulting molded product were examined as explained below, and the results are shown in FIG. 1 to FIG. 4.

1. styrene-butadiene block copolymer by Asahikasei KK, specific gravity: 0.95, melt index (ASTM 1238): E 2.6
2. Type P-200 by Kyodo Sekiyu KK : V.G.C. 0.824, Methods of measuring the various properties plotted in FIG. 1. to FIG. 4:

Viscosity: B-type Viscometer manufactured by Tokyo Keiki Seisakusho, Rotor No. 4 (thickness: 1.5 mm, diameter: 27 mm), revolution rate: 2 - 20 r.p.m. The indicated viscosity was measured at 25°C. Strength (tensile strength), elongation, hardness, oil-resistance (No. 2 testing oil): by JIS K6301. Permanent set: After the sample was elongated 200% at 50°C for 5 hours, the degree of the permanent set(%) retained in the elongated sample was measured (according to JIS K 6,301).

FIG. 1 shows the relationship between the content of the rubber component (% by weight) in the composition and the viscosity of the composition, the strength of the hardened and molded product and the oil-resistance of the product, where the composition consisted of 25 parts by weight of unsaturated polyester, 20 parts by weight of crosslinking agent, 20 parts by weight of plasticizer and varying amounts of rubber component. The molded product therefrom was also tested.

FIG. 2 shows the relationship between the content of the unsaturated polyester component (% by weight) in the composition and the hardness, tensile strength and elongation of the hardened and molded product obtained from the composition, where the composition consisted of 30 parts by weight of rubber component, 20 parts by weight of crosslinking agent, 20 parts by weight of plasticizer and varying amounts of unsaturated polyester.

FIG. 3 shows the relationship between the content of the crosslinking agent (% by weight) in the composition and the tensile strength, elongation and permanent set of the hardened and moldled product obtained from the composition, where the composition consisted of 30 parts by weight of rubber component, 25 parts by weight of unsaturated polyester, 20 parts by weight of plasticizer and varying amounts of crosslinking agent.

FIG. 4 shows the relationship between the content of the plasticizer (% by weight) in the composition and the viscosity of the composition and the tensile strength and elongation of the hardened and molded product obtained from the composition, where the composition consisted of 30 parts by weight of rubber component, 25 parts by weight of unsaturated polyester, 20 parts by weight of crosslinking agent and varying amounts of plasticizer..

As will be understood from the results of FIGs. 1 - 4, the objects of the present invention can be attained only by using composite compositions which consist of the four components in the respective proportions as specifically defined in the present specification. This has been explained in detail hereinbefore in the specification.

EXAMPLE 6

The following thermoplastic elastomers each consisting of 1,3-butadiene and styrene were prepared in toluene under a nitrogen atmosphere using sec-butyl lithium as a catalyst.

Sample (A): polystyrene-polybutadiene-polystyrene block elastomer (number average molecular weight of each block: 18,000 - 60,000 - 22,000, respectively).

Sample (B):polybutadiene-polystyrene-polybutadienepolystyrene block elastomer (number average molecular weight of each block: 4,500 - 17,000 - 62,000 - 18,000, respectively).

Sample (C): polystyrene-polybutadiene-polystyrenepolybutadiene block elastomer (number average molecular weight of each block: 17,000 - 40,000 - 14,000 - 40,000, respectively).

Apart from the above elastomers, an unsaturated polyester (copolymer of 1.10 mols of propylene glycol and 1.05 mols of maleic anhydride, acid value: 45, molecular weight: 1,000) was dissolved in styrene, the amount of styrene being 30% by weight. In addition, paraffin process oil having a V.G.C. of 0.790 was prepared and admixed with the unsaturated polyester-styrene system in the various proportions as shown in Table 9 at 95°C in a closed mixer.

Table 9

| Composition | (21) | (22) | (23) | (24) | (25) | (26) | (27) |
|---|---|---|---|---|---|---|---|
| Sample A | 30 | — | — | 30 | 1 | 30 | 50 |
| Sample B | — | 30 | — | — | — | — | — |
| Sample C | — | — | 30 | — | — | — | — |
| Styrene | 25 | 25 | 25 | 35 | 30 | 1 | 20 |
| Polyester | 25 | 25 | 25 | 35 | 30 | 30 | 0 |
| Paraffin oil | 20 | 20 | 20 | 0 | 39 | 39 | 30 |

In the above compositions, compositions (21) through (23) fall within the scope of the present invention, while the other compositions fall outside the scope of the present invention. In the latter compositions, at least one of the components is always outside the scope of the proportions as defined for the present invention.

The compositions were hardened and molded at 150°C under a pressure of 35 kg/cm² for 8 minutes using 1.5% by weight of t-butyl-peroctoate as an initiator intimately blended therein.

The properties of the products obtained are shown in Table 10.

Table 10

| Characteristic<br>Composition | Tensile strength[1] (kg/cm²) | Elongation[1] (%) | 300%M[1] (kg/cm²) | Hardness[1] (A-type) | Elasticity (Dunlop) | Permanent set [1] (%) |
|---|---|---|---|---|---|---|
| Composition (21) | 215 | 485 | 105 | 52 | 65 | 30 |
| Composition (22) | 220 | 460 | 101 | 49 | 62 | 30 |
| Composition (23) | 215 | 475 | 104 | 52 | 65 | 32 |

Table 10-continued

| Characteristic | Tensile strength[1] (kg/cm²) | Elongation[1] (%) | 300%M[1] (kg/cm²) | Hardness[1] (A-type) | Elasticity (Dunlop) | Permanent set[1] (%) |
|---|---|---|---|---|---|---|
| Composition (24) | 175 | 185 | — | 90 | 45 | — |
| Composition (25) | 45 | 200 | — | 50 | 35 | 95 |
| Composition (26) | 15 | 195 | — | 55 | 40 | 90 |
| Composition (27) | 55 | 250 | — | 60 | 40 | 65 |

[1]test method: JIS K-6310
[1]test method: After being elongated 200% at 50°C for 5 hours, the degree of permanent set (%) was measured.

Comparing compositions (21) through (23) and compositions (24) through (27), it is apparent that the composite compositions (21) – (23) of the present invention have far superior elastic properties over compositions (24) – (27) which are outside the scope of the present invention.

More precisely, the present compositions are superior to composition (24), which does not contain plasticizer, with respect to physical properties, permanent set, etc., are far superior to composition (25), where the proportion of the thermoplastic block elastomer is outside the scope of the present invention, with respect to almost all properties, and are superior to compositions (26) and (27), where the proportions of reactive monomer, polyester, etc., are outside the scope of the present invention. In this experiment, the synergistic effect of the four components of the present composite compositions is apparent.

As described in detail in the above explanation, the composite compositions of the present invention are liquid compositions which have extremely excellent molding and processing capability. In particular, the plasticizer has the function of not only lowering the hardness of the hardened products but also further improves various rubber properties such as elasticity, tear strength, permanent set, etc., together with the other three components. These are surprising merits that could not be anticipated from the conventional prior art.

It is considered that these merits result from the synergistic effect of the four components. The present invention provides liquid composite compositions which may easily be processed to form rubber materials having good rubber properties almost equal to those of natural rubber. Thus, the present invention has industrially valuable merits.

While the invention has been described in detail and with reference to specific embodiments thereof, it will be apparent to one skilled in the art that various changes and modifications can be made therein without departing from the spirit and scope thereof.

What we claim is:

1. Composite elastomer compositions which comprise at least four components:
   a. 15–45 parts of at least one rubber component selected from the group consisting of polybutadiene, polychlorobutadiene, polyisobutylene, copolymers of isobutylene with isoprene, polyisoprene, copolymers of ethylene and propylene, acrylic rubber, copolymers of a diolefin and acrylonitrile, random or block copolymers of styrene-butadiene, non-vulcanized natural rubbers, polybutadiene terminated with hydroxy or carboxy terminal groups and a mixture of two or more of such substances;
   b. 5–60 parts of at least one unsaturated polyester;
   c. 5–50 parts of at least one crosslinkable monomer containing ethylenically unsaturated bonds; and
   d. 15-60 parts of at least one plasticizer selected from the group consisting of paraffin series process oil, naphthene series process oil, aromatic series process oil, liquid paraffins, n- or iso-butene homopolymers or a copolymer thereof, said polymers or copolymers thereof having a molecular weight of 500 to 5,000, low molecular weight polybutadiene, phthalic acid esters or fatty acid esters, per 100 parts by weight of composition, which compositions are liquid at normal temperature, have a viscosity of $10 - 10^5$ poises at normal room temperature and which can be hardened by heat or by means of a radical catalyst.

2. The composite elastomer compositions as claimed in claim 1 where the average molecular weight of the at least one rubber component is 10,000 to 2,000,000.

3. The composite elastomer compositions as claimed in claim 2 where the average molecular weight is 50,000 to 500,000.

4. The composite elastomer compositions as claimed in claim 2 where the rubber component is one which has a Mooney viscosity $ML_{1+4}$ (100°C) of about 20 to about 70.

5. The composite elastomer compositions as claimed in claim 1 where the rubber component is a thermoplastic block elastomer of the following formulae:

$(A — B)_{n+1}$ and/or
$B — (A — B)_{n+1}$ and/or
$A — (B — A)_n$ where A represents a polymer block of a vinyl aromatic compound, B represents a conjugated diolefin polymer block, and n represents an integer of 1 – 20, the proportion of the A block in the molecular being 5 – 60% by weight.

6. The composite elastomer compositions as claimed in claim 5 where the block elastomer has an average molecular weight of 10,000 to 1,000,000.

7. The composite elastomer compositions as claimed in claim 6 where the block elastomer has an average molecular weight of 50,000 to 750,000.

8. The composite elastomer compositions as claimed in claim 5 where the block elastomer has a melt index of about 0.5 to about 15 g/10 min.

9. The composite elastomer compositions as claimed in claim 8 where the polymer block of a vinyl aromatic compound is of the formula

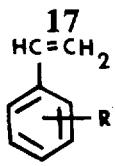

where R is hydrogen, chlorine or $C_1$ to $C_5$ alkyl and the conjugated diolefin block is butadiene or isoprene.

10. The composite elastomer compositions as claimed in claim 9 where the vinyl aromatic compound is styrene and the conjugated diolefin is butadiene.

11. The composite elastomer compositions as claimed in claim 1 where the unsaturated polyester component is selected from the group consisting of unsaturated polyesters obtained from at least one polyhydric alcohol, at least one saturated dicarboxylic acid and at least one unsaturated dicarboxylic acid.

12. The composite elastomer compositions as claimed in claim 11 where the polyhydric alcohol is at least difunctional, and the unsaturated polyester has a molecular weight of from 500 to 10,000.

13. The composite elastomer compositions as claimed in claim 12 where the polyhydric alcohol is selected from the group consisting of ethylene glycol, diethylene glycol, triethylene glycol, propylene glycol, dipropylene glycol, 1,3-butane-diol, or a mixture of two or more of said alcohols, the saturated dicarboxylic acid is selected from the group consisting of adipic acid, sebacic acid, pimelic acid, succinic acid, terephthalic acid, isophthalic acid, phthalic acid, or a mixture of two or more of said saturated acids, and the unsaturated dicarboxylic acid is selected from the group consisting of maleic acid, maleic anhydride, fumaric acid, itaconic acid, or a mixture of two or more said unsaturated acids.

14. The composite elastomer compositions as claimed in claim 13 where the molar ratio of unsaturated carboxylic acid: saturated carboxylic acid is 2-8:8-2.

15. The composite elastomer compositions as claimed in claim 1 where the crosslinkable monomer is selected from the group consisting of acrylic acid, methacrylic acid or an alkyl ester thereof, styrene, chloro-styrene, vinyl-toluene, diethylene-glycol diacrylate and divinyl-benzene, and a mixture of two or more of those monomers.

16. The composite elastomer compositions as claimed in claim 1 where the plasticizer is selected from the group consisting of a paraffin series process oil of a V.G.C. of 0.790 – 0.849, a naphthene series process oil of a V.G.C. of 0.850 – 0.899, an aromatic series process oil of a V.G.C. of 0.900 or greater, and liquid paraffins.

17. The composite elastomer compositions as claimed in claim 1 where the content of the rubber component (a) is 15–45 parts and the content of the plasticizer component (d) is 15–60 parts, each per 100 parts by weight of the composition.

18. The composite elastomer compositions as claimed in claim 1 where (a) the at least one rubber component is a thermoplastic block elastomer of the following formulae:

(A — B)$_{n+1}$ and/or
B — (A — B)$_{n+1}$ and/or
A— (B— A)$_n$ where A represents a polymer block of a vinyl aromatic compound, B represents a conjugated diolefin polymer block, and n represents an integer of 1–20, the proportion of the A block in the molecule being 5–60% by weight, of a melt index of about 0.5 to about 15 g/10 min.; (b) the at least one unsaturated polyester is selected from the group consisting of unsaturated polyesters obtained from at least one polyhydric alcohol, at least one saturated dicarboxylic acid and at least one unsaturated dicarboxylic acid, wherein the polyhydric alcohol is selected from the group consisting of ethylene glycol, diethylene glycol, triethylene glycol, propylene glycol, dipropylene glycol, 1,3- -butane-diol, or a mixture of two or more of said alcohols, the saturated dicarboxylic acid is selected from the group consisting of adipic acid, sebasic acid, pimelic acid, succinic acid, terephthalic acid, isophthalic acid, phthalic acid, or a mixture of two or more of said saturated acids, and the unsaturated dicarboxylic acid is selected from the group consisting of maleic acid, maleic anhydride, fumaric acid, itaconic acid, or a mixture of two or more of said unsaturated acids, the unsaturated polyester having a molecular weight of from 500 to 10,000; (C) the at least one crosslinkable monomer is selected from the group consisting of acrylic acid, methacrylic acid or an alkyl ester thereof, styrene, chloro-styrene, vinyl-toluene, diethyleneglycol diacrylate and divinyl-benzene, and a mixture of two or more of those monomers; and (d) the at least one plasticizer is selected from the group consisting of paraffin series process oil, naphthene series process oil, aromatic series process oil, liquid paraffins, n- or iso- butene polymers or a copolymer thereof, low molecular weight polybutadiene, phthalic acid esters or fatty acid esters.

19. The composite elastomer compositions as claimed in claim 18 where the plasticizer is selected from the group consisting of a paraffin series process oil of a V.G.C. of 0.790 – 0.849, a naphthene series process oil of a V.G.C. of 0.850 – 0.899, an aromatic series process oil of a V.G.C. of 0.900 or greater, and liquid paraffins.

20. The composite elastomer compositions as claimed in claim 21 where the polymer block of a vinyl aromatic compound is of the formula

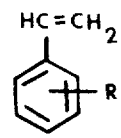

where R is hydrogen, chlorine or $C_1$ to $C_5$ alkyl and the conjugated diolefin is block butadiene or isoprene.

21. The composite elastomer compositions as claimed in claim 1 consisting essentially of said at least four components.

22. The composite elastomer compositions as claimed in claim 1 wherein said plasticizer has a viscositty of from 10 centipoises to $10^4$ poises.

23. The composite elastomer composition as claimed in claim 1 where the cross-linkable monomer is a monofunctional cross-linkable monomer.

24. The composite elastomer composition as claimed in claim 1 where the cross-linkable monomer is a polyfunctional cross-linkable monomer.

25. The composite elastomer composition as claimed in claim 1 where the cross-linkable monomer comprises a mixture of monofunctional and polyfunctional cross-linkable monomers.

26. The composite elastomer compositions as claimed in claim 1 wherein said cross-linkable monomer is selected from the group consisting of acrylic acid, methylacrylic acid or an alkyl ester thereof, styrene, chlorostyrene, vinyltoluene, diethylene glycol diacrylate, divinylbenzene or a mixture of two or more of such cross-linkable monomers.

27. The composite elastomer compositions as claimed in claim 1 wherein the average molecular weight of said unsaturated polyester is from 500 to 10,000.

28. The composite elastomer compositions as claimed in claim 1 wherein:

said plasticizer dissolves or swells the rubber components;

said cross-linkable monomer is selected from the group consisting of acrylic acid, methylacrylic acid or an alkyl ester thereof, styrene, chlorostyrene, vinyltoluene, diethylene glycol diacrylate, vinylbenzene or a mixture of two or more such cross-linkable monomers; and the unsaturated polyester component is obtained from at least one polyhydric alcohol, at least one saturated dicarboxylic acid and at least one unsaturated dicarboxylic acid, where the polyhydric alcohol is selected from the group consisting of ethylene glycol, diethylene glycol, triethylene glycol, propylene glycol, dipropylene glycol, 1,3-butanediol, or a mixture of two or more of said alcohols, the saturated dicarboxylic acid is selected from the group consisting of adipic acid, sebacic acid, pimelic acid, succinic acid, terephthalic acid, isophthalic acid, phthalic acid, or a mixture of two or more of said saturated acids, and the unsaturated dicarboxylic acid is selected from the group consisting of maleic acid, maleic anhydride, fumaric acid, itaconic acid, or a mixture of two or more said unsaturated acids, the molar ratio of unsaturated carboxylic acid: saturated carboxylic acid being 2-8:8-2.

* * * * *